Figure 1:
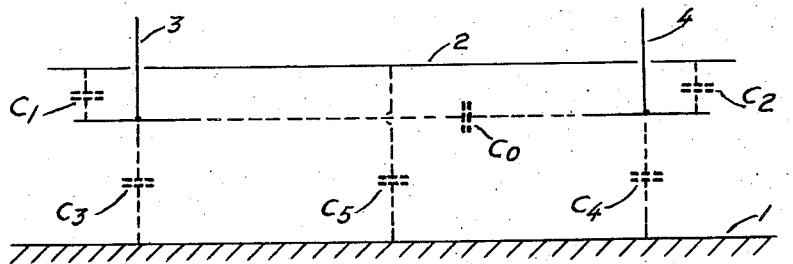

Aug. 27, 1946.  A. D. BLUMLEIN  2,406,529
ELECTRICAL APPARATUS FOR INDICATING OR MEASURING DISTANCES
Filed June 13, 1942  3 Sheets-Sheet 1

INVENTOR
Alan Dower Blumlein
BY Loyd Hall Sutton
ATTORNEY

Aug. 27, 1946. A. D. BLUMLEIN 2,406,529
ELECTRICAL APPARATUS FOR INDICATING OR MEASURING DISTANCES
Filed June 13, 1942 3 Sheets-Sheet 2
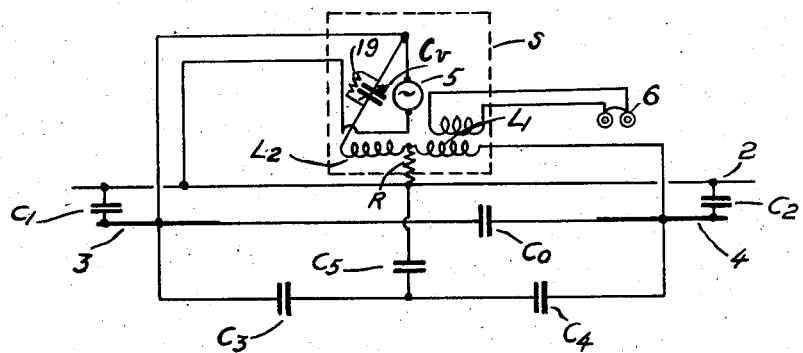
Fig. 4.
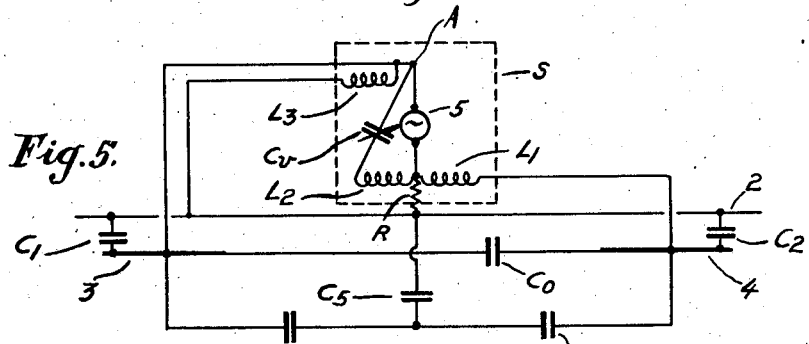
Fig. 5.
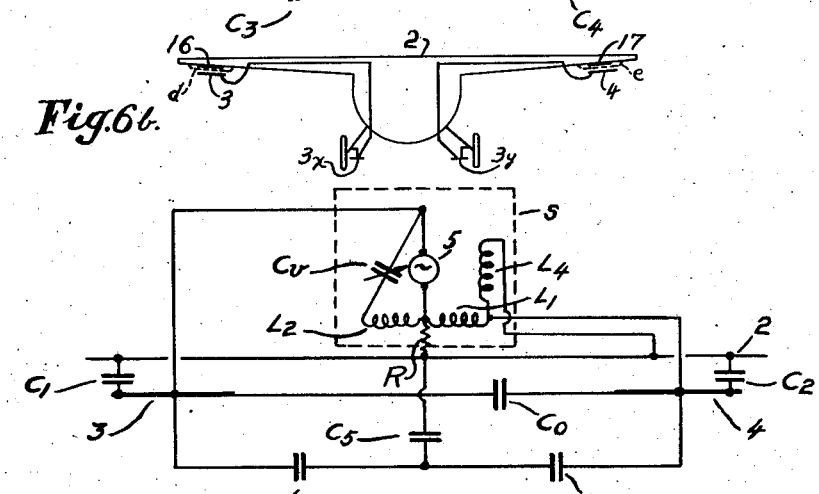
Fig. 6b.
Fig. 6.
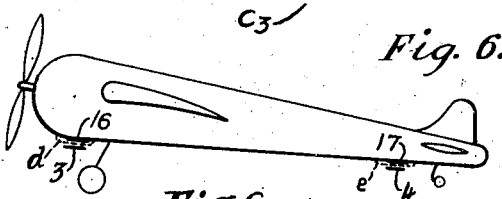
Fig. 6c.
INVENTOR
Alan Dower Blumlein
BY Loyd Hall Sutton
ATTORNEY Aug. 27, 1946.    A. D. BLUMLEIN    2,406,529
ELECTRICAL APPARATUS FOR INDICATING OR MEASURING DISTANCES
Filed June 13, 1942    3 Sheets-Sheet 3

INVENTOR
Alan Dower Blumlein
BY Loyd Hall Sutton
ATTORNEY

Patented Aug. 27, 1946

2,406,529

UNITED STATES PATENT OFFICE 2,406,529

ELECTRICAL APPARATUS FOR INDICATING OR MEASURING DISTANCES

Alan Dower Blumlein, Ealing, London W. 5, England, assignor to Electric & Musical Industries Limited, Hayes, Middlesex, England, a company of Great Britain Application June 13, 1942, Serial No. 446,972
In Great Britain January 10, 1940

22 Claims. (Cl. 177—352)

The present invention relates to electrical apparatus for the indication or measurement of the distance between an object and a conducting surface.

It has previously been proposed to determine the height of an aircraft by effectively measuring the capacity between an electrode carried by said aircraft and the earth. Such methods, however, suffer from the disadvantage that the earth capacity to be measured is in general a very small fraction of the capacity between said electrode and said aircraft, and as the latter is usually subject to casual changes the changes in said earth capacity are frequently masked by said casual changes.

It is the object of the present invention to provide an arrangement for the indication or measurement of the distance of an object from a conducting surface in which said disadvantage is reduced or eliminated.

According to one feature of the present invention, there is provided apparatus for indicating the distance from a conducting surface of an object, such as an aircraft, which is at least partially conducting, said apparatus comprising a first and a second electrode attached to said object and insulated therefrom, said electrodes being arranged so that the capacity therebetween is a function of the distance between said object and said surface, and a bridge network for indicating variations in said capacity due to variation in said distance, said bridge network comprising two tightly coupled inductances, a balancing impedance and said capacity, the first of said inductances being connected between said first electrode and the conducting part of said object and in series with said capacity and the second inductance being connected in series with said balancing impedance, means for applying alternating voltage to said bridge network and indicating means for indicating the balance of said bridge network, the arrangement being such that said variation of capacity between said electrodes can be indicated substantially independently of the capacity between each of said electrodes and said object. Preferably, said voltage applying means is arranged to apply alternating voltages between said second electrode and said conducting part of said object and to apply alternating voltage of the same frequency but lower amplitude across said second inductance and said balancing impedance in series respectively, the arrangement being such that said variation in capacity can be indicated in terms of a balancing impedance of low value. The circuit associated with one or both of said electrodes may be returned to a point in the conducting part of said object adjacent thereto, whereby errors due to coupling between said circuits which would otherwise be caused by current flow in the conducting part of said object can be reduced or eliminated.

If desired, said balance indicating means may comprise means for combining a voltage derived from said voltage applying means with a voltage derived from one or both of said coupled inductances and for rectifying said combined voltages so as to produce a current or voltage dependent in amplitude and sense upon the degree and sense of unbalance of said bridge.

Preferably, said balancing impedance is arranged to be controlled automatically in accordance with the degree and sense of unbalance of said bridge so as to adjust said bridge towards balance, and if said balancing impedance comprises an electrically controlled mechanical system, means may be provided for modifying the phase and/or amplitude of the current or voltage controlling said impedance so as to reduce or prevent hunting or instability due to said mechanical oscillatory system. Said balancing impedance may conveniently be a variable condenser comprising two electrodes spaced apart from each other and from a plate-like electrode, one or both of said electrodes being movable over the surface of said plate-like electrode to adjust the spacing between said electrodes, the arrangement being such that the spacing between said electrodes is substantially greater than the spacing between either of said electrodes and said plate-like electrode at least over the greater part of said range of adjustment, said plate-like electrode being held at a fixed potential so as to reduce the direct capacity between said electrodes. Each of said electrodes may be in the form of conducting coatings upon an insulating sheet attached to said object, the area of said coating being less than the area of said sheet so as to provide an insulating border to said coating, and said insulating sheet may be provided with a further conducting coating upon the opposite side to that carrying said electrode, said coating being connected to said object and arranged to serve as an electrode for the current flowing through said insulating sheet.

Said object may be an aircraft, in which case said electrodes are positioned beneath said aircraft and preferably beneath the extremities of the fuselage or beneath the extremities of the wings thereof.

If desired, means may be provided for giving an indication when said bridge is out of balance by a predetermined amount, and means may be provided for automatically controlling the distance of said object from said surface in accordance with the sense and degree of unbalance of said bridge so as to maintain said distance substantially constant.

Figure 2:
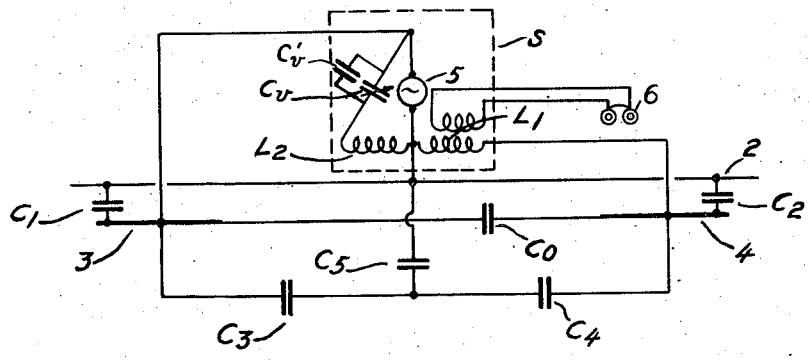
Figure 3:
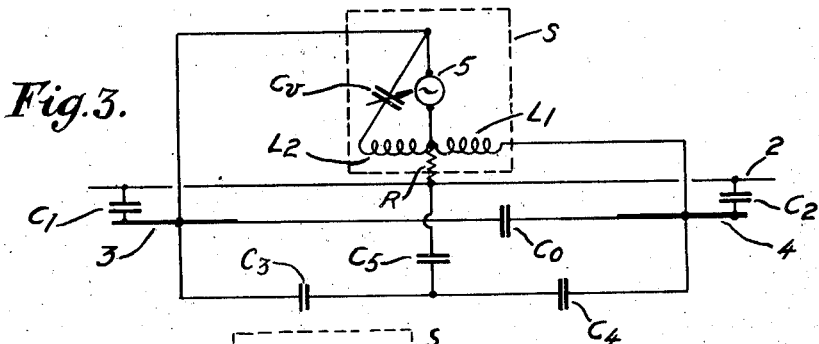
Figure 6A:
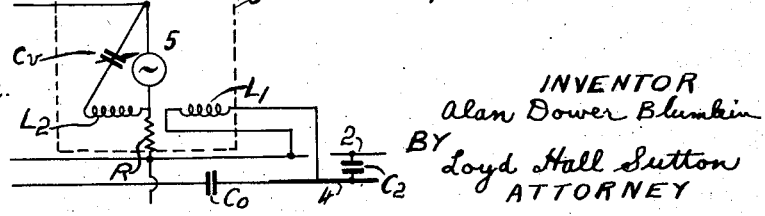
Figures 8, 9:
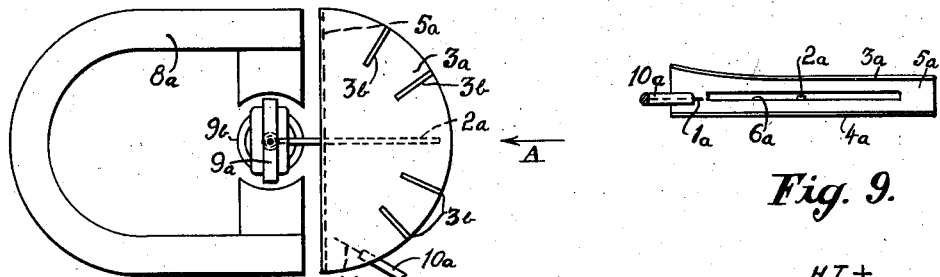
Figure 10:
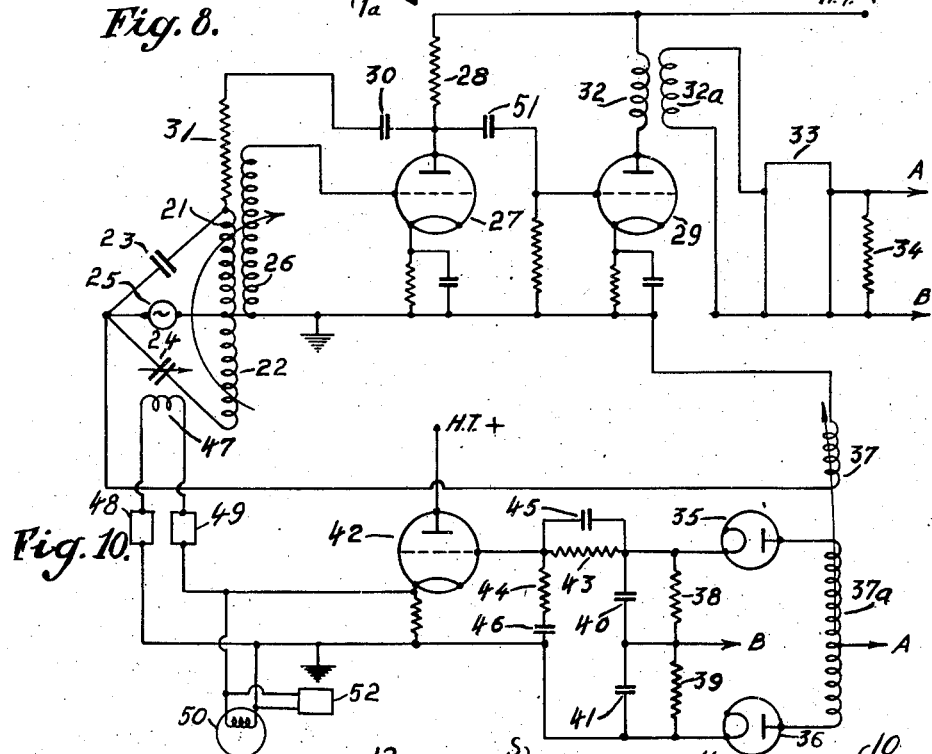
Figure 7:
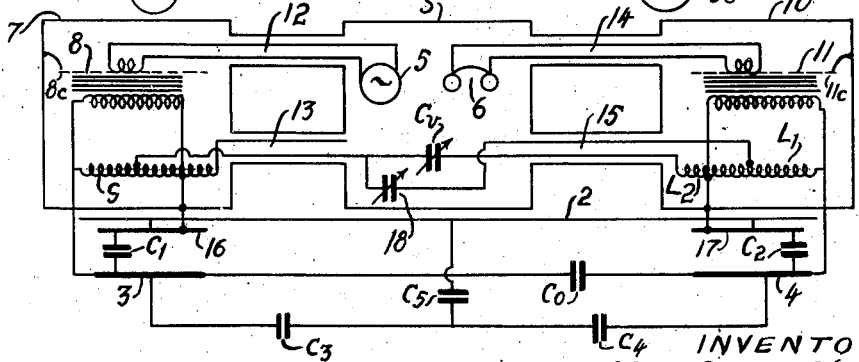

In order that the invention may be clearly understood and readily carried into effect, it will now be more fully described by way of example as applied to apparatus for indicating the height of an aircraft. Reference will be made to the accompanying drawings, in which, Figure 1 shows the capacities resulting from an aircraft and two wing electrodes, Figure 2 shows a circuit diagram of a bridge arrangement according to the invention for the measurement of the direct capacity between the wing electrodes of an aircraft, Figure 3 is an explanatory diagram and Figures 4, 5 and 6 are circuit diagrams showing the various means for suppressing undesired couplings in a bridge arrangement of the kind shown in Figure 2, Figure 6a is a modification of the circuit shown in Figure 6; Figures 6b and 6c illustrate diagrammatically aircraft having electrodes mounted in different positions, Figure 7 illustrates a practical arrangement for indicating the height of an aircraft, Figure 8 shows a plan view of a condenser suitable for use in arrangements according to the invention, Figure 9 shows an end elevation looking in the direction of the arrow in Figure 8, and Figure 10 shows a circuit arrangement embodying means for modifying the phase and/or amplitude of the control current or voltage for use in a self-balancing bridge.

In Figure 1 of the drawings, 1 represents a conducting surface, such as the sea, and 2 represents an aircraft or other object, the height of which above the surface 1 is to be determined. The aircraft 2, which is at least partially conducting is provided with two electrodes 3, 4, which may be in the form of conducting plates, which are preferably fixed to the under-surfaces of the fuselage of the aircraft 2 and insulated therefrom. The capacities of this system are indicated in Figure 1, and are as follows:

$C_0$ direct capacity between electrodes 3, 4.
$C_1$ capacity between electrode 3 and the aircraft 2.
$C_2$ capacity between electrode 4 and the aircraft 2.
$C_3$ capacity between electrode 3 and the surface 1.
$C_4$ capacity between electrode 4 and the surface 1.
$C_5$ capacity between aircraft 2 and the surface 1.

Providing that the aircraft is sufficiently conducting to avoid substantial changes in the superficial conductivity of the aircraft for example under different weather conditions, capacities $C_0$, $C_1$ and $C_2$ will remain constant, and only capacities $C_3$, $C_4$ and $C_5$ will vary with the height of the aircraft 2 above the surface 1, so that by measuring changes in the capacity of the T network comprising capacities $C_3$, $C_4$ and $C_5$ the height of the aircraft 2 may be determined. As, however, capacities $C_1$ and $C_2$ are very much larger than any of the other capacities, it is difficult in practice to make the desired measurement of changes in the capacity of said capacity network.

According to the main feature of the present invention, this measurement is facilitated by the use of a bridge having tightly coupled inductive ratio arms. Such a bridge is shown in Figure 2, in which elements corresponding to those shown in Figure 1 are given the same reference numbers. In this figure, 5 represents a generator of alternating current which is connected in shunt with the capacity $C_1$, and the capacity $C_2$ is shunted by an inductance $L_1$ to which is tightly coupled a further inductance $L_2$, the inductances $L_1$ and $L_2$ forming ratio arms of the bridge. One end of the inductance $L_2$ is connected to one end of inductance $L_1$, these ends being connected as shown to the metal framework of the aircraft 2, and the other end of the inductance $L_2$ is connected via an adjustable capacity $C_v$ to the generator 5. A balance indicator in the form of telephones 6 or other suitable device is provided to indicate the balance condition of the bridge. As the capacity $C_1$ is connected across the generator 5, it has no effect upon the balance of the bridge. Further, when the bridge is at or near balance, the voltage across the inductance $L_1$ will be very small, since, due to the tight coupling between the inductances $L_1$ and $L_2$, the voltage induced in it by the current flowing through the inductance $L_2$ will be substantially equal and opposite to the voltage drop across it due to the current flowing through the capacities $C_0$, $C_3$ and $C_4$. Thus, substantially no current will flow through the capacity $C_2$ so that this capacity also has substantially no effect upon the balance of the bridge. The capacity $C_v$ may thus be adjusted to balance the effective capacity of the network comprising the capacities $C_0$, $C_3$, $C_4$ and $C_5$ and the value to which $C_v$ is adjusted will be related to the height of the aircraft 2 and will be substantially independent of the capacities $C_1$ and $C_2$. Conveniently, the capacity $C_0$, which does not vary appreciably with height, may be balanced out by adjusting a subsidiary balancing capacity $C'_v$ connected in a similar manner to $C_v$ to bring the bridge into balance when the aircraft is at a height such that the capacities $C_3$, $C_4$, $C_5$ are small in relation to $C_0$.

Although the arrangement shown in Figure 2 makes it possible to measure very small changes in capacity between the electrodes 3 and 4 in spite of the presence of the relatively larger capacities $C_1$ and $C_2$, it is found that this measurement may be rendered inaccurate due to unwanted couplings between the leads to said electrodes. The metal of the aircraft is not in general a perfect conductor, and resistances, which may vary in flight, are thus introduced into the bridge system and cause errors in measurement.

These difficulties will be more fully described with reference to Figure 3 of the drawings. The apparatus comprising the inductances $L_1L_2$, the generator 5 and the capacity $C_v$ is conveniently housed in a screened box S centrally disposed in the aircraft 2 and electrically bonded to the metal framework thereof and screened leads are run to the electrodes 3 and 4. Current from the generator 5 thus flows through a screened lead to the electrode 3 and return via the capacity $C_1$ and the metal framework of the aircraft 2 to the screened box containing the apparatus. This path will have a finite resistance, part of which will be common to the path by which the capacity $C_2$ is returned to said screened box, with the result that a voltage drop due to the current returning via the capacity $C_1$ will be fed to the capacity $C_2$, as will be seen from Figure 3, which shows the circuit of Figure 2 re-drawn with a resistance R representing the resistance common to the two paths above referred to. Due to this voltage drop across the resistance R, therefore, current will be fed through the inductance $L_1$. This current will be dependent upon the value of R, which is unlikely to remain constant, and will have a component in quadrature with the current fed directly through the network comprising the capacities $C_0$, $C_3$, $C_4$ and $C_5$ to the inductance $L_1$. Thus, the balance of the bridge will be disturbed in a casual manner by variation in R, and a sharp minimum across the inductances $L_1$, $L_2$ will not be obtainable due to the presence of the current component in quadrature which will not be balanced.

The unwanted coupling due to resistance R may be removed in various ways which will now be described with reference to Figures 4 to 6 of the drawings.

Referring to Figure 4, it will be seen that the arrangement therein shown differs from that shown in Figure 3 in that the generator 5 has been placed directly in shunt with the capacity $C_1$ so that the current through this capacity from the generator 5 no longer passes through the resistance R and the unwanted coupling is thus eliminated. The connection of the generator 5 in shunt with the capacity $C_1$ may be effected by returning the "earthy" side of the generator to the metal framework of the aircraft not via the screening box S housing the generator, but via a lead connected to the metal framework of the aircraft 2 in the neighbourhood of the electrode 3. Thus, if the generator comprises a valve oscillator with a transformer output, the output winding of the transformer may be connected on the one hand to the bridge and to the screened lead connected to the electrode 3 in the screened box S and on the other hand to the metal framework of the aircraft 2 in the neighbourhood of the electrode 3. If the oscillator comprises a valve oscillator with a choke or resistance coupled output, the output circuit should be earthed or decoupled to a point on the metal portion of the aircraft 2 in the neighbourhood of the electrode 3, so that the current fed to the capacity $C_1$ is prevented from passing through the resistance R.

Referring now to Figure 5, it will be seen that the arrangement shown therein differs from that shown in Figure 3, in that an inductance $L_3$ is connected in parallel with the capacity $C_1$. The inductance $L_3$ is chosen so as to tune the capacity $C_1$, so that the inductance $L_3$ and the capacity $C_1$ form a rejector circuit of high impedance in series with the generator 5 which reduces the current flowing through the resistance R. The desired connection of the inductance $L_3$ may be achieved by connecting the right hand end of said inductance $L_3$ to the point A in the bridge network as shown and connecting the left hand end to the metal framework of the aircraft 2 in the neighbourhood of the electrode 3 so that the oscillatory currents in the rejector circuit do not flow through the resistance R.

The capacity $C_2$ may be treated in a similar manner as shown in Figure 6, an inductance $L_4$ being connected on the one hand to the outer end of the inductance $L_1$ to which the electrode 4 is connected and on the other hand to the aircraft 2 in the neighbourhood of the electrode 4. The inductance $L_4$ is preferably chosen so as to tune the capacity $C_2$ to resonance at the frequency of the generator 5, and thus to provide a high impedance in series with the voltage drop developed across the resistance R to the current fed through the capacity $C_1$ thus reducing the undesired currents through the capacity network comprising the capacities $C_0$, $C_3$, $C_4$ and $C_5$. Alternatively, as shown in Figure 6a inductance $L_4$ can be omitted and the inductance $L_1$ chosen to resonate with the capacity $C_2$ and returned to earth by a connection to the metal framework of the aircraft 2 in the neighbourhood of the electrode 4.

Yet another problem arises from the fact that when an aircraft flies over the sea, spray is liable to reach wing electrodes such as the electrodes 3, 4 and to increase their leakance to the aircraft. It is therefore desirable that effects of this kind should have as little effect as possible upon the height measurement, and errors due to this cause may be minimised by the following methods. Firstly, a conductance balance may be provided to enable the bridge to be balanced for the conductance component of the capacity to be measured. Such a conductance balance may be obtained by adjustment of a resistance 19, see Figure 4, in parallel with said balancing capacity $C_v$. Secondly, the generator 5 feeding the electrode 3 may be arranged to have a low impedance so as to render the voltage set up across the electrode 3 less dependent upon variation of its leakance to the aircraft 2 than would otherwise be the case.

Thirdly, the capacity $C_2$ is preferably shunted by a relatively low resistance in order that the effect of variations in the leakance associated with this capacity due to leakage between the electrode 4 and the aircraft 2 may be reduced. In order to maintain a high signal to noise ratio at the input of the amplifier to which the voltage across the inductance $L_1$ $L_2$ is applied, this low resistance is preferably provided by means of negative feedback as described in British patent specification No. 528.179, since the noise which would be introduced by a physical damping resistance is thereby avoided as will be appreciated from Figure 10 hereinafter referred to.

When the aircraft 2 approaches the surface I very closely, the increase in the capacity $C_5$ may take place more rapidly than the increase in the capacities $C_3$ and $C_4$ due, for example, to the closer proximity of parts of the aircraft 2, such as landing gear or floats, than the electrodes 3, 4 to the surface 1. This may cause an increasing proportion of the current from the capacity $C_3$ to be bypassed by the capacity $C_5$, with the result that the rate of increase of the current through the capacity $C_4$ with decrease of the height of the aircraft 2 will diminish and the sensitivity of the indicating device be reduced. This undesirable effect may be reduced by providing subsidiary electrodes $3x$ and $3y$ (Figure 6b) on the lowest part of the aircraft 2, for example, the under-carriage or floats, which may be connected to the wing electrodes 3 and 4 respectively as shown.

Said electrodes 3 and 4, and also said subsidiary electrodes $3x$ and $3y$ may take the form of sprayed metal coatings upon sheets of flexible insulating material $d$ and $e$, Figure 6b, attached to the under surface of the aircraft. A plastic material such as that known by the registered trade-mark "Cellon" or "Cellastoid" may conveniently be used, as such material may be deformed so as to conform to the curvature of the surface to which they are to be attached. Each sheet may have an area of several square feet. The whole of the rear surface of each sheet is preferably metallised as indicated at 16 and 17 so as to provide a low resistance connection for the capacity current flowing through the sheet and the central area of the outer surface of the sheet is metallised to form the electrode, a considerable margin being left unsprayed so as to reduce leakage from the electrode across the surface of the sheet to the metallic parts of the aircraft. It is important that the electrodes be spaced as far apart as possible and that their relative position shall change as little as possible in flight. For this reason, it is preferable to secure the electrodes to the fuselage rather than to the wings, which usually bend somewhat under the normal stress of flight. It has been found satisfactory to mount the electrodes beneath the nose and the tail of the aircraft as shown in Figure 6c, and as far away as possible from any metallic members projecting downwards from the aircraft.

As the changes of capacity which arise from variation in the height of the aircraft are very small, it will be appreciated that even when the inductance $L_1$ is large in relation to $L_2$ the balancing condenser $C_v$ will be of very small magnitude in the arrangement which has been described above. This difficulty may be overcome by decreasing the voltage applied to the capacity $C_v$ by the generator 5 in relation to the voltage applied to the electrode 3. It will be appreciated that for the flux developed in $L_1$ by the current flowing through the capacity system $C_0$, $C_3$, $C_4$, $C_5$, to equal the flux developed in $L_2$ by the current flowing through the balancing capacity $C_v$ which is the balance condition, the following relationship must hold, namely, that $$C_v = mnc$$

where $c$ = capacity of said capacity system,
$m$ = ratio of voltage applied to said system,
$n$ = ratio of turns of inductance $L_1$ and $L_2$, $m$ and $n$ can each conveniently be arranged to be 10 or more so that the bridge may be balanced by means of a capacity $C_v$ at least 100 times greater than the capacity to be measured, thus making it possible to use a much more convenient size of balancing capacity.

An arrangement of this kind will now be described with reference to Figure 7 of the drawings, in which elements corresponding to elements shown in Figures 1 to 6 are given similar reference numerals and characters. It will be seen that the arrangement comprises three units each consisting of a screening box earthed to the metal framework of the aircraft and housing parts of the bridge. The control screening box S, which is located in a position accessible to the aircraft crew, contains the generator 5, the balancing capacity $C_v$ and the balance indicator, which may be the telephones 6. The screening box 7 is located in the neighbourhood of the electrode 3, and contains the transformer 8 and the tapped choke 9, the purpose of which will be hereinafter explained. The screening box 10 is located in the neighbourhood of the electrode 4 and contains the close coupled inductances $L_1$ and $L_2$ previously referred to and the transformer 11. Screened cables 12, 13 and 14, 15 couple the apparatus in the screening boxes 7 and 10 respectively with the apparatus in the screening box S.

The bridge arrangement will be seen to be essentially the same as that described above with reference to Figure 2 except that the apparatus has been located in separate units and that the voltage applied to the balancing capacity is lower than the voltage applied to the electrode 3. Current from the generator 5 is led over the screened cable 12 to the step-up transformer 8, the secondary winding of which is connected between the electrode 3 and the metallic backing 16 of the insulator carrying said electrode which is in contact with the metal framework of the aircraft. The majority of the turns of the inductance 9 are connected in parallel with said secondary winding and a tapping on said inductance 9 is connected via the screened cable 13 to one side of the balancing capacity $C_v$ so that a fraction of the voltage across said winding is applied to said capacity $C_v$. The other side of said capacity $C_v$ is connected, via the screened cable 15 to the outer end of the inductance $L_2$. The outer end of the inductance $L_1$, which has many more turns than $L_2$ is connected to the electrode 4, and the common point of the inductance $L_1L_2$ is connected to the metallic backing 17 of the insulator carrying the electrode 4. The balance is indicated by the telephones 6 which are coupled via the screened cable 14 and the step-down transformer 11 across the inductance $L_1$, and when the sound in said telephones is a minimum, the direct capacity between the electrodes 3 and 4 is calculable in terms of the ratio of turns of the inductances $L_1$, $L_2$ and the ratio of voltages applied to the electrode 3 and the balancing capacity $C_v$. As each ratio may be 10 or more, it is thus possible to measure said direct capacity by means of a balancing capacity $C_v$ at least 100 times greater in value.

In order to reduce the possibility of error due to the flow of bridge currents in the metallic parts of the aircraft by unwanted capacity couplings between the bridge apparatus and the metallic parts of the aircraft, the balancing capacity $C_v$ is connected to the inductances $L_2$ and 9 over balanced cables. Thus, a conductor is run in parallel with each conductor connected to said capacity $C_v$ and excited with an equal and opposite voltage, which may be derived in the one case from a tapping on the inductance $L_1$ and in the other case from a tapping beyond the earth tapping on the inductance 9. This ensures that substantially no current will flow from the capacity $C_v$ through the capacity of the screened leads to the metallic parts of the aircraft. It is also possible to provide electrostatic screens 8c and 11c between the windings of the transformers 8 and 11, said screens being connected to the metal framework of the aircraft. The lead forming the balanced pair with the lead from the capacity $C_v$ to the inductance $L_2$ may be connected to one side of another balancing capacity 18, the other side of which is connected to the side of the capacity $C_v$ connected to the inductance 9. Said capacity 18 may then be used to balance out the minimum capacity of the capacity $C_v$.

It will be appreciated that the transformer 8 may be arranged to tune the capacity and the inductance 9 to resonance with the frequency of the generator 5 so as to decrease the current demand upon said generator.

It will be noted that the balance of the bridge is indicated by the voltage set up across the inductance $L_1$. In practice, the coupling between the inductances $L_1$ and $L_2$ can rarely be made sufficiently close to ensure that the outer ends of these inductances are at earth potential when the bridge is balanced, and as the capacity $C_2$ in shunt with the inductance $L_1$ is much greater than that in shunt with $L_2$, it is preferable to measure the voltage developed across $L_1$ and to balance the bridge so as to bring this voltage to zero, thus ensuring that the capacity $C_2$ shall have substantially no effect upon the balance. It is also desirable, in the interests of efficiency, to tune the circuit across which the out-of-balance voltage is measured.

Although, as has been explained, the bridge may be balanced by means of a condenser having a much larger capacity than the capacity change to be measured, the balancing capacity is nevertheless quite small. A convenient type of variable condenser for use as a balancing capacity in this arrangement, more particularly in the self-balancing arrangement which will hereinafter be described, will now be described with reference to Figures 8 and 9 of the drawings.

Referring to Figures 8 and 9, it will be seen that the condenser comprises a fixed electrode $1a$ and a movable electrode $2a$, each of which should be of thin wire or strip as shown. The electrodes $1a$ and $2a$ are spaced apart from each other and from further electrodes $3a$ and $4a$, the latter being in the form of semi-circular metal plates, one of which, shown at $3a$, is bent as shown in Figure 9 to modify the law of the condenser as will be hereinafter explained. The further electrodes $3a$ and $4a$ are joined along their diametral edges by a metal plate $5a$ having a longitudinal slot $6a$ through which the element $2a$ projects. If desired, the plate $5a$ and the further electrodes $3a$ and $4a$ may be formed by pressing a single sheet of metal to the shape shown.

The electrode $2a$ is preferably attached to the moving coil $9a$ of a moving coil milliammeter $8a$. The electrode $2a$ may therefore be moved in relation to the electrode $1a$ by adjusting the current through the moving coil $9a$.

The electrode $1a$ is preferably provided with a shielded lead $10a$ for attachment to the source of alternating voltage.

It will be seen that the spacing between the electrodes $1a$ and $2a$ is substantially greater than the spacing between either of these electrodes and the further electrodes $3a$ and $4a$ over the majority of the range of adjustment. If these further electrodes are earthed, their presence will reduce the direct capacity between the electrodes $1a$ and $2a$ due to the fact that some of the lines of force which would in the absence of the further electrodes $3a$ and $4a$ pass between the electrodes $1a$ and $2a$ will be diverted to said further electrodes $3a$ and $4a$. The extent to which the direct capacity between the electrodes $1a$ and $2a$ is modified by the presence of the further electrodes $3a$ and $4a$ is dependent upon the relative spacings of said electrodes from each other and from said further electrodes, and consequently the extent of this modification is dependent upon the position of the movable electrode $2a$. It has been found that the capacity between the electrodes $1a$ and $2a$ in the arrangement of the kind shown in Figures 8 and 9 varies according to an approximately exponential law as the spacing between said electrodes is varied providing that the effective area of the adjustable electrode $2a$ protruding through the gap remains substantially constant over the range of adjustment of said electrode and provided the electrodes are spaced well apart.

Departures from the exponential law due to variation of the effective area of said electrode $1$ may be compensated by bending one or both of the further electrodes $3a$ and $4a$ as to modify the separation between said further electrodes and said electrode $1a$ at different points in the range of adjustment of the latter electrode. The further electrodes $3a$ and $4a$ may also be shaped so as to modify the capacity law to a law differing from an accurate exponential law. Further, either or both of said further electrodes $3a$, $4a$ may be provided with slots $3b$, which may preferably be radial, so as to permit the shape of said electrodes to be readily adjusted at different points for the same purposes.

It will be appreciated that the convenience of a bridge indicator will be greatly increased if it can be arranged to be self-indicating, so that there is no necessity for manual adjustment. The type of balancing condenser which has just been described lends itself to automatic control, and a self-indicating type of bridge will now be described with reference to Figure 10 of the drawings. It will be seen from this figure that the bridge comprises the two tightly coupled inductive ratio arms $21$, $22$ (corresponding to $L_1$ and $L_2$, Figure 2), the capacity $23$ (corresponding to the capacity network comprising $C_0$, $C_3$, $C_4$ and $C_5$ of Figure 2) to be measured and the adjustable condenser $24$ (corresponding to $C_v$, Figure 2), which is preferably of the kind above referred to which is adapted to be adjusted by a control current. The bridge is supplied as shown with alternating current by the generator $25$.

Out of balance currents in said bridge induce alternating voltages in the coil $26$, which is coupled to said inductive ratio arms $21$, $22$, and these voltages are applied to the control electrode of a valve $27$, and corresponding amplified voltages appear across the resistance $28$ in the anode circuit of said valve. These amplified voltages may be further amplified as necessary and finally fed to the control electrode of the output valve $29$. If desired, the valve $27$ may be provided with a feedback path comprising a blocking condenser $30$ and a high resistance $31$ connected to the inductive ratio arm $21$ as shown, so as effectively to provide a low resistance shunt across said ratio arms as previously described so as to limit the effects of leakage between the electrode connected to the inductance $21$ and the metal portions of the aircraft.

The amplified voltages appearing in the anode circuit of the valve $29$ are fed via the transformer $32$, $32a$ and the phase adjusting device $33$ to a load resistance $34$. Voltages derived from the generator $25$ are applied in push-pull to the diodes $35$, $36$ via the transformers $37$, $37a$, the latter winding being centre-tapped and connected to the end A of the resistance $34$. The diodes $35$, $36$ are provided with output resistances $38$, $39$ respectively, the common point of which is connected to the end B of the resistance $34$. The voltage set up across resistance $34$ is thus applied to each of the diodes $35$, $36$. The resistances $38$, $39$ are shunted by the capacities $40$, $41$, which serve to by-pass alternating currents having frequencies equal to or higher than the frequency of the generator $25$.

The rectified voltages set up across the resistances $38$, $39$ in series are applied to the control electrode of the cathode follower valve $42$ via the network comprising the resistances $43$, $44$, and the capacities $45$, $46$, the purpose of which will hereinafter be explained. The output of the cathode follower valve $42$ is fed via filters adapted to remove alternating current to the actuating winding $47$ of the adjustable capacity element $24$. Said actuating winding $47$ is preferably isolated from earth by connecting high impedance series circuits 48, 49 tuned to the frequency of the alternating voltage fed to the bridge in series with its leads.

The arrangement operates as follows: The phase-adjusting device 33 is so adjusted that when the bridge departs from balance due to a change in the capacity 23, the phase of the currents in the inductive ratio arms changes by ±90°, according to the sense of the unbalance, so that the voltage set up across the resistance 34 moves into or out of phase with the voltage in the winding 37. Thus, the amplitude of the alternating voltage applied to the diodes 35, 36, is greatly modified and the rectified voltages across resistances 38, 39, are changed in the opposite senses, so that the voltage across these resistances in series changes in magnitude and sense. These changes in voltage are caused to control the adjustable capacity element 24 in the sense appropriate to adjust said element so as to tend to restore the balance of the bridge. The control current fed to said capacity element 24 may also be fed to a meter 50 calibrated in terms of the capacity to be measured, so that the value of the capacity 23, which is a function of the height of an aircraft, may be continuously indicated.

The type of current controlled condenser which has been described is particularly convenient in this connection, since it has a law which is of the same general form as that relating the capacity between the electrodes and the height of the aircraft, namely, exponential, so that its deflection will be a linear function of the height of the aircraft.

It has been assumed in the above description that the adjustable condenser 24 responds instantaneously to changes in the control current fed to it, so that no phase-change is introduced as between said control current and the change of capacity of said condenser 24. In practice this is not necessarily the case. Consider the adjustable condenser described above with reference to Figures 8 and 9 of the drawings. It comprises a moving coil milliammeter, the pointer of which constitutes the moving electrode of the adjustable condenser, said pointer being provided with a spring control 9b. The moving system of such an adjustable condenser may be regarded as equivalent to an inductance, representing the inertia of the pointer, in series with a capacity representing the compliance or elasticity of the spring control, together with a series resistance representing the damping on the moving system. It will, therefore, be appreciated that if the moving coil of such a device be fed with alternating current the displacement of the pointer will be in phase with the applied alternating current if the frequency of said current is much lower than the resonance frequency of the moving system, but that, as the frequency of the alternating current rises up to and beyond said resonance frequency, a phase difference, finally increasing to 180°, will arise between said current and the displacement of said pointer. Thus, a phase angle dependent upon frequency is introduced between the control current and the displacement of said pointer, and as the capacity of said adjustable condenser is dependent upon the displacement of said pointer, this means that a phase angle has been introduced between the control current and the adjustable capacity.

Two effects arise in practice by reason of this phase angle. The first is that the adjustable condenser tends to hunt at its resonant frequency since any change in the control current will cause the pointer to over-swing due to its inertia and thus cause a control current in the opposite sense to be applied, so that oscillation of the pointer at its resonant frequency will be set up. The second effect is a tendency towards instability, due to the fact that for currents of frequencies higher than the resonant frequency of the moving system, the control circuit operates so as to increase the unbalance of the bridge, since the control current and the capacity change produced thereby are in anti-phase at such frequencies.

The first of the above-mentioned effects is reduced or eliminated by attenuating components of the control current having a frequency equal to or greater than the resonant frequency of the moving system. Such attenuation is conveniently provided by the resistance 43 and the capacity 46 in the output circuit of the diodes 35, 36. The resistance 43 may have a value such as 2 megohms, and the capacity 46 a value of 1.4 $\mu$F.

Although such a circuit will produce considerable attenuation of the components having the above-mentioned frequencies, components of a sufficiently high frequency to give rise to the second effect above referred to may still pass at a sufficient amplitude to cause instability, and accordingly, additional circuit elements are provided to rotate the phase of such higher frequency components so as to prevent the control currents from causing the adjustable capacity element to operate so as to increase the unbalance of the bridge. For this purpose, a capacity 45, which may be of 0.01 $\mu$F, is connected in parallel with the resistance 43 and a resistance 44 which may be 50,000 ohms connected in series with the capacity 46.

It will be appreciated that similar circuits may be applied to current controlled bridge elements having more complex mechanical systems than that of the adjustable capacity element referred to above by providing correction circuits in the control current channel which attenuate current components having frequencies equal to the mechanical resonance frequencies of the system and which modify suitably the phase of current components which might give rise to instability.

In order to reduce the effects of overloading, due for example to accidental unbalance, one or more stages of the amplifier is or are preferably provided with a high impedance anode load e. g., 28 to limit increase in anode current and the time constant of the coupling circuit e. g., 51, to the control electrodes of the following valves arranged to be short so as to permit quick recovery from grid current.

It is not of course essential that the bridge shall be balanced, since it may suffice for some purposes, for example to maintain a given height, to provide the pilot of the aircraft with a warning whenever the height of the aircraft departs by a predetermined amount from the desired height. Thus, the adjustable condenser may be adjusted to balance the bridge when the aircraft is at a desired height above the sea, and small out of balance voltages set up across the bridge due to changes in the direct capacity between the electrode consequent upon small changes in the height of the aeroplane then utilised to operate some indicator or some control 52 adapted to correct the change in height.

Although the invention has been described with reference to the indication of the height of an aircraft above the sea, it will be appreciated that it may be applied generally to the measurement or indication of the distance of any object from any conducting surface.

It will be appreciated that, as is generally the case with four terminal bridge networks, the generator of voltage and the telephones or the like may be interchanged, if desired.

What I claim is:

1. Apparatus for indicating the distance of an object, such as an aircraft, which is at least partially conducting, from a conducting surface, said apparatus comprising a first electrode and a second electrode each attached to said object and insulated therefrom, each of said electrodes having capacity to said object and to said conducting surface, a first and a second inductance tightly coupled together, a balancing impedance, means for effectively connecting the ends of said first inductance to the conducting part of said object and to said first electrode respectively, and means effectively connecting said balancing impedance between said second electrode and said second inductance, and further connecting means whereby said first and second inductances form two arms of a bridge network, whereby said balancing impedance forms a third arm of said bridge network and whereby the capacities between said first electrode and said surface and between said surface and said second electrode effectively form a fourth arm of said bridge network, a source of alternating voltage, means for effectively applying voltage from said source across opposite points or one diagonal of said network, balance indicating means, and means effectively connecting said balance indicating means across the other diagonal of said network so as to indicate the state of balance of said network, the arrangement being such that changes in capacity between said electrodes due to change of said distance can be indicated substantially independently of said capacities between said electrodes and said object.

2. Apparatus for indicating the distance of an object such as an aircraft which is at least partially conducting from a conducting surface, said apparatus comprising a first electrode and a second electrode, each attached to said object and insulated therefrom, each of said electrodes having capacity to said object and to said conducting surface, a first and a second inductance tightly coupled together, a balancing impedance, a source of alternating voltage comprising means for providing an alternating voltage of high amplitude and an alternating voltage of low amplitude, means for applying said alternating voltage of high amplitude effectively across said first inductance and the capacity between said first and second electrodes in series, means for applying said alternating voltage of low amplitude effectively across said balancing impedance and said second inductance in series, and further connections whereby said first and second inductance form two arms of a bridge network, whereby said balancing impedance forms a third arm of said bridge network and whereby the capacities between said first electrode and said surface and between said surface and said second electrode effectively form a fourth arm of said bridge network, balance indicating means, and means effectively connecting said balance indicating means to said network so as to indicate the state of balance of said network, the arrangement being such that changes in capacity between said electrodes due to change of said distance can be indicated substantially independently of said capacities between said electrodes and said object.

3. Apparatus as claimed in claim 1 in which said balance indicating means comprises means for deriving an alternating voltage from said source, means for deriving an alternating voltage from at least one of said coupled inductances and means for combining said derived voltages so as to produce a voltage dependent in amplitude and sense upon the degree and sense of unbalance of said bridge network and means for adjusting said balancing impedance under the control of said voltage so as to adjust said bridge network towards balance.

4. Apparatus as claimed in claim 2 in which said balance indicating means comprises means for deriving an alternating voltage from said source, means for deriving an alternating voltage from at least one of said coupled inductances and means for combining said derived voltages so as to produce a voltage dependent in amplitude and sense upon the degree and sense of unbalance of said bridge network and means for adjusting said balancing impedance under the control of said voltage so as to adjust said bridge network towards balance.

5. Apparatus as claimed in claim 1 in which said balancing impedance comprises an electrically controllable mechanical oscillatory system and in which said balance indicating means comprises means for deriving an alternating voltage from said source, means for deriving an alternating voltage from at least one of said coupled inductances and means for combining said derived voltages so as to produce a voltage dependent in amplitude and sense upon the degree and sense of unbalance of said bridge network, means for modifying at least the phase of said last mentioned voltage and means for applying said voltage after said phase modification to control said mechanical oscillatory system so as to cause said balancing impedance to adjust said bridge towards balance without instability due to said mechanical oscillatory system.

6. Apparatus as claimed in claim 2 in which said balancing impedance comprises an electrically controllable mechanical oscillatory system and in which said balance indicating means comprises means for deriving an alternating voltage from said source, means for deriving an alternating voltage from at least one of said coupled inductances and means for combining said derived voltages so as to produce a voltage dependent in amplitude and sense upon the degree and sense of unbalance of said bridge network, means for modifying at least the phase of said last mentioned voltage and means for applying said voltage after said phase modification to control said mechanical oscillatory system so as to cause said balancing impedance to adjust said bridge towards balance without instability due to said mechanical oscillatory system.

7. Apparatus as claimed in claim 1 in which said balance indicating means comprises means for producing voltages dependent in amplitude and sense upon the degree and sense of unbalance of said bridge and in which said balancing impedance comprises a variable condenser having a stationary electrode, a movable electrode and a plate-like electrode, means for supporting said stationary electrode adjacent to said plate-like electrode but spaced therefrom, a weak current meter having a movable element, means attaching said movable electrode to said movable element and for spacing said movable electrode from said stationary electrode and said plate-like electrode, the spacing between said stationary electrode and said movable electrode being substantially greater than the spacing between either said stationary electrode or said movable electrode and said plate-like electrode at least over the greater range of movement of said movable electrode, means for holding said plate-like electrode at a fixed potential, and means for feeding to said weak current meter currents proportional to said voltages produced by said balance indicating means so as to cause said moving element to move said movable electrode to adjust the capacity between said stationary and movable electrodes to balance said bridge network.

8. Apparatus as claimed in claim 2 in which said balance indicating means comprises means for producing voltages dependent in amplitude and sense upon the degree and sense of unbalance of said bridge and in which said balancing impedance comprises a variable condenser having a stationary electrode, a movable electrode and a plate-like electrode, means for supporting said stationary electrode adjacent to said plate-like electrode but spaced therefrom, a weak current meter having a movable element, means attaching said movable electrode to said movable element and for spacing said movable electrode from said stationary electrode and said plate-like electrode, the spacing between said stationary electrode and said movable electrode being substantially greater than the spacing between either said stationary electrode or said movable electrode and said plate-like electrode at least over the greater range of movement of said movable electrode, means for holding said plate-like electrode at a fixed potential and means for feeding to said weak current meter currents proportional to said voltages produced by said balance indicating means so as to cause said moving element to move said movable electrode to adjust the capacity between said stationary and movable electrodes to balance said bridge network.

9. Apparatus as claimed in claim 1 comprising a thermionic valve having a control grid circuit and an anode circuit, means providing negative feedback between said anode circuit and said control grid circuit and means for connecting said control grid circuit to said first electrode and to a conducting part of said object so as effectively to provide a low resistance shunt having low noise voltage between said first electrode and said conducting part of said object, whereby the effect of changes in the conductance between said electrode and said object upon the balance of said bridge is reduced.

10. Apparatus as claimed in claim 2 comprising a thermionic valve having a control grid circuit and an anode circuit, means providing negative feedback between said anode circuit and said control grid circuit and means for connecting said control grid circuit to said first electrode and to a conducting part of said object so as effectively to provide a low resistance shunt having low noise voltage between said first electrode and said conducting part of said object, whereby the effect of changes in the conductance between said electrode and said object upon the balance of said bridge is reduced.

11. Apparatus as claimed in claim 1 in which said source of alternating voltage is of low impedance, whereby the effect upon the sensitivity of said bridge network of changes in the conductance between said second electrode and said object is reduced.

12. Apparatus as claimed in claim 2 in which said source of alternating voltage is of low impedance, whereby the effect upon the sensitivity of said bridge network of changes in the conductance between said second electrode and said object is reduced.

13. Apparatus as claimed in claim 1 comprising inductive means and means for effectively connecting said inductive means between said first electrode and a point on a conducting part of said object in the neighbourhood of said first electrode so as to tune the capacity between said first electrode and said object to resonance at the frequency of said alternating voltage.

14. Apparatus as claimed in claim 2 comprising inductive means and means for effectively connecting said inductive means between said first electrode and a point on a conducting part of said object in the neighbourhood of said first electrode so as to tune the capacity between said first electrode and said object to resonance at the frequency of said alternating voltage.

15. Apparatus as claimed in claim 1 comprising inductive means and means for effectively connecting said inductive means between said second electrode and a point on a conducting part of said object in the neighbourhood of said second electrode so as to tune the capacity between said second electrode and said object to resonance at the frequency of said alternating voltage.

16. Apparatus as claimed in claim 2 comprising inductive means and means for effectively connecting said inductive means between said second electrode and a point on a conducting part of said object in the neighbourhood of said second electrode so as to tune the capacity between said second electrode and said object to resonance at the frequency of said alternating voltage.

17. Apparatus as claimed in claim 1 in which said balance indicating means comprises means for producing voltages dependent in amplitude and sense upon the degree and sense of unbalance of said bridge and in which said balancing impedance comprises a variable condenser having a stationary electrode, a movable electrode and a plate-like electrode, means for supporting said stationary electrode adjacent to said plate-like electrode but spaced therefrom, a weak current meter having a movable element, means attaching said movable electrode to said movable element and for spacing said movable electrode from said stationary electrode and said plate-like electrode, the spacing between said stationary electrode and said movable electrode being substantially greater than the spacing between either said stationary electrode or said movable electrode and said plate-like electrode at least over the greater range of movement of said movable electrode, means for holding said plate-like electrode at a fixed potential, means for feeding to said weak current meter currents proportional to said voltages produced by said balance indicating means so as to cause said moving element to adjust the capacity between the stationary and movable electrodes of said balancing impedance to balance said bridge network, a further weak current meter and means for feeding to said further weak current meter currents proportional to said voltages produced by said balance indicating means so as to cause said further weak current meter to indicate the setting of said weak current meter, whereby said further weak current meter can be arranged to give an indication of said distance.

18. Apparatus as claimed in claim 2 in which said balance indicating means comprising means for producing voltages dependent in amplitude and sense upon the degree and sense of unbalance of said bridge and in which said balancing impedance comprises a variable condenser having a stationary electrode, a movable electrode and a plate-like electrode, means for supporting said stationary electrode adjacent to said plate-like electrode but spaced therefrom, a weak current meter having a movable element, means attaching said movable electrode to said movable element and for spacing said movable electrode from said stationary electrode and said plate-like electrode, the spacing between said stationary electrode and said movable electrode being substantially greater than the spacing between either said stationary electrode or said movable electrode and said plate-like electrode at least over the greater range of movement of said movable electrode, means for holding said plate-like electrode at a fixed potential, means for feeding to said weak current meter currents proportional to said voltages produced by said balance indicating means so as to cause said moving element to adjust the capacity between the stationary and movable electrodes of said balancing impedance to balance said bridge network, a further weak current meter and means for feeding to said further weak current meter currents proportional to said voltages produced by said balance indicating means so as to cause said further weak current meter to indicate the setting of said weak current meter, whereby said further weak current meter can be arranged to give an indication of said distance.

19. Apparatus as claimed in claim 1 in which said means for effectively applying voltage from said source across opposite points of said network comprises connections from said source to said second electrode and to a point on the conducting portion of said object in the neighbourhood of said second electrode.

20. Apparatus as claimed in claim 2, in which said means for applying said alternating voltage of high amplitude effectively across said first inductance and the capacity between said first and said second electrodes in series comprises connections between said means for providing alternating voltage of high amplitude and said second electrode and a point in a conducting portion of said object in the neighbourhood of said second electrode and in which said means for providing alternating voltage of low amplitude comprises step-down transforming means connected between said second electrode and said point in the neighbourhood of said second electrode.

21. Apparatus as claimed in claim 2 in which said means for applying said alternating voltage of high amplitude effectively across said first inductance and the capacity between said first and second electrodes in series comprises connections between said means for providing alternating voltage of high amplitude and said second electrode and a point in a conducting portion of said object in the neighbourhood of said second electrode and in which said means for providing alternating voltage of low amplitude comprises step-down transforming means connected between said second electrode and said point in the neighbourhood of said second electrode and in which said first and second inductances are located in the neighbourhood of said first electrode, and means connecting said first inductance to said first electrode and to a point in the conducting portion of said object in the neighbourhood of said first electrode.

22. Apparatus for indicating the distance of an object, such as an aircraft, which is at least partially conducting, from a conducting surface, said apparatus comprising a first electrode and a second electrode each attached to said object and insulated therefrom, each of said electrodes having capacity to said object and to said conducting surface, a first and a second inductance tightly coupled together, a balancing impedance, means for effectively connecting the ends of said first inductance to the conducting part of said object and to said first electrode respectively, and means effectively connecting said balancing impedance between said second electrode and one end of said second inductance, means for connecting the other end of said second inductance to the conducting part of said object whereby said first and second inductances form two arms of a bridge network, whereby said balancing impedance forms a third arm of said bridge network and whereby the capacities between said first electrode and said surface and between said surface and said second electrode form a fourth arm of said bridge network, a source of alternating voltage, means for effectively applying voltage from said source across one diagonal of said bridge network, balance indicating means, and means effectively connecting said balance indicating means across the other diagonal of said bridge network so as to indicate the state of balance of said network, whereby changes in capacity between said electrodes due to change of said distance can be indicated substantially independently of said capacities between said electrodes and said object.

ALAN DOWER BLUMLEIN.